Figure 1:
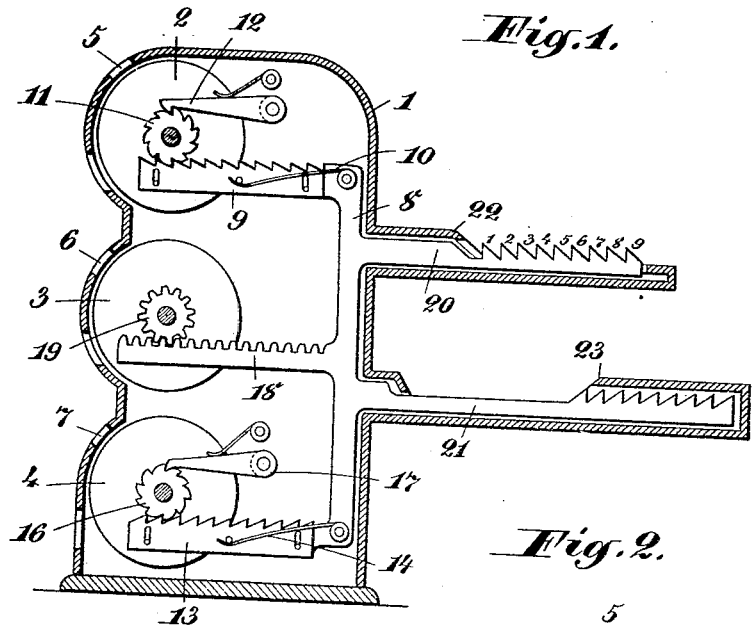

M. KLACZKO.
CASH REGISTER AND THE LIKE.
APPLICATION FILED NOV. 27, 1912.

1,123,198.

Patented Dec. 29, 1914.
2 SHEETS—SHEET 1.

Witnesses
E. Batchelder
P. N. Pezzetti

Inventor
Max Klaczko
by Taylor Brown Quimby
Attys

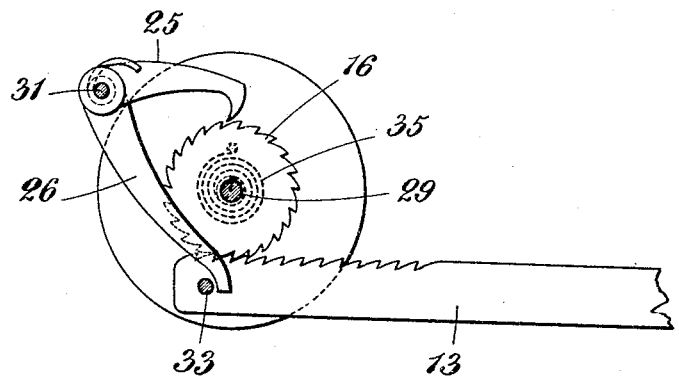
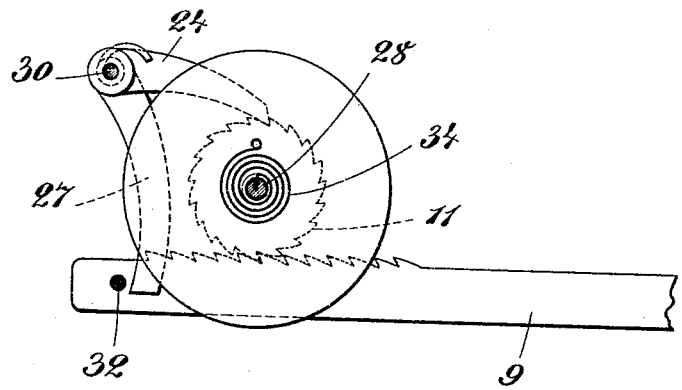

UNITED STATES PATENT OFFICE.

MAX KLACZKO, OF RIGA, RUSSIA.

CASH-REGISTER AND THE LIKE.

1,123,198.  Specification of Letters Patent.  Patented Dec. 29, 1914.

Application filed November 27, 1912. Serial No. 733,793.

*To all whom it may concern:*

Be it known that I, MAX KLACZKO, a subject of the Emperor of Russia, and residing at 19 Scheunenstrasse, in the city of Riga, in the Russian Empire, and having a place of business at 44 Rosenthalerstrasse, in the city of Berlin, Kingdom of Prussia, and German Empire, have invented certain new and useful Improvements in Cash-Registers and the like, of which the following is a specification.

This invention refers generally to registers for cash and credit or debit transactions, and in particular to cash and controlling registers and the like in which the amounts involved in a transaction are indicated by the action of gear wheels or the like which are acted upon by means of toothed segments or the like having teeth arranged in opposite directions, and it is particularly intended to so improve the construction of devices of this kind, as to make it possible to indicate both the credit as well as the debit items or the purchasing price and the amount paid by the customer, as well as the change, in a very easy, convenient and striking manner. In view of the fact that in the autographic register constructed according to my invention, the amounts of the different items which are to make up the account of the customer remain visible from the start, all errors and differences of opinion, likely to occur about the justice of the charge or of the registration, are excluded and the amount of the balance or of the change to be paid out to the customer can be easily checked and controlled, and can be compared with the actual payment by the customer or with the credit item, and as a result of the fact that the device effects an automatic indication of the balance and carries out the necessary subtractions, the work of the salesman is considerably decreased, so that his attention is not turned away from other important work and errors in making up the account are wellnigh entirely excluded, all the different items required for the transaction remaining visible to all concerned until the transaction is finished, as distinguished from previous devices in which the indication of the amount paid had to be canceled, before the other registrations and indications could be effected. The three different kinds of indications or registrations are effected by counting wheels which are operated by means of a slide or the like having three different kinds of toothed racks or segments to engage with said counting wheels, and so arranged that only the counting wheel for the balance or change will remain engaged with the corresponding rack bar or the like all the time, while the other two counting wheels are only temporarily engaged with their corresponding actuating rack bars, any suitable means being employed for displacing the slide referred to.

Figure 2:
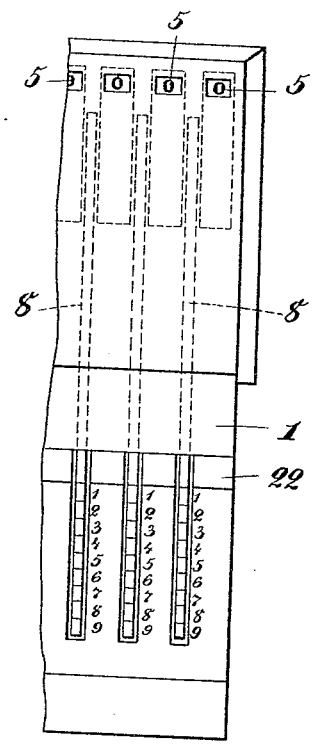

On the accompanying drawing I have shown one kind of embodiment of my invention diagrammatically in connection with an autographic or cash register, Figure 1 being a vertical longitudinal section; Fig. 2 a top plan view, broken off, and Fig. 3 being a front elevation shown broken off, Figs. 4 and 5 are elevations, showing by way of example a kind of zeroizing mechanism that may be employed in connection with my invention.

As shown in the drawing, the casing of box 1 of the cash register contains the rollers or disks 2, 3 and 4 carrying numbers on their peripheries which become visible in the windows or openings 5, 6, 7, respectively. Upon the axes of these rollers or disks 2, 3, 4 toothed wheels 11, 19, 16 are arranged which engage with rack bars or segments 9, 18, 13 respectively, each roller or disk and the accompanying toothed wheel constituting a complete counting wheel. These rack bars or segments are connected to a slide 8 in such a manner that the rack bars or segments 9, 13 which respectively engage with the toothed wheels 11, 16 are capable of moving toward and away from the axes of the two disks or rollers 2 and 4 respectively which are used for indicating the amount received by the seller and the amount to be paid by the purchaser. This bodily movement of the rack bars or segments 9, 13 may be effected by a sliding or pivotal connection of said rack bars or segments with the slide 8 so that these rack bars or segments may either rotate somewhat about their points of connection or they may move back and forth in a straight path. The rack bars or segments 9, 13 are provided with vertical slots into which small guide pins arranged at the side wall of the device may enter. Springs 10, 14 arranged in any suitable manner and preferably connected to the slide 8 and the free ends of which bear against pins on said rack bars or segments 9, 13 respectively serve to hold the rack bars yieldingly in engagement with their respective toothed wheels. Thus, the movement of the rack bar 9 may for instance impart to the toothed or ratchet wheel 11 a rotation toward the right, while when the rack bar 9 is moved back, it slides over the teeth of the toothed wheel without actuating the same, the wheel being locked in its position by means of a spring acting pawl 12. A similar pawl 17 locks the ratchet or toothed wheel 16 in its position. This wheel is moved by the rack bar 13 in the opposite direction relatively to the wheel 11, in the present instance toward the left. The other toothed or gear wheel 19 remains continuously engaged with the corresponding rack bar or segment 18 which is rigidly connected to the slide 8. According to the direction of movement of the said slide 8 the gear wheel 19 and the roller or disk 3 which is secured to the axis of said wheel 19 are rotated in different directions. The gear wheel 19 constitutes a part of an ordinary counting mechanism for effecting additions and subtractions and not shown in the drawing, and it is provided with the usual transmission gearing for registering tens, hundreds and so on, not shown in the drawing. For the other toothed wheels 11 and 16 for the registration of the amount paid and of the price of the article to be sold, there is no necessity of any transmission or counting wheels, but it is obvious, that I may also arrange the wheels 11, and 16 or the rollers or disks 2 and 4 respectively, so as to cause them to transmit their indications to any suitable adding or counting mechanism, so as to obtain the total amounts of the daily sales and to effect the checking of the indications of the counting mechanism 3, 19.

Figure 3:
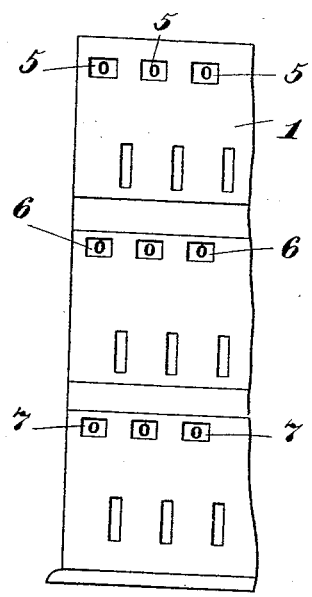

As shown in Figs. 2 and 3 of the drawing there may be more than one wheel in each of the sets of indicating wheels 2, 3 and 4 respectively and there may be likewise more than one slide 8 with racks 9, 18 and 13 respectively.

The slide 8 may be operated in any suitable manner so as to cause it to move back and forth in the manner described. It may be provided with one or more handles, and in the embodiment of the invention shown in the drawing, the slide 8 is provided with two indicating and adjusting devices in the form of handles to be operated from the outside and corresponding to the rollers or disks 2 and 4. These handles or projections 20, 21 may be provided with ratchet teeth or indentations which are indicated on the outside of corresponding projections 22, 23 of the casing 1, so as to register the amounts to be indicated by the rollers or disks 2, 4. Thus for instance the bar or handle 20 may serve for indicating the amount paid by the customer or the credit items, while the bar or handle 21 may serve for the indication of the purchase price or of the debit items. After the transaction has been effected or the account has been made up, the three counting wheels or disks or rollers 2, 3, 4 are moved back into their normal positions corresponding to zero by any well known suitable device.

Suitable means for zeroizing the indicating wheels 2 and 4 are shown by way of example in Figs. 4 and 5 of the drawing. In said figures, 24 and 25 are pawls which retain the indicating wheels 11 and 16 in position, after having been moved to indicate a number involved in transaction. These pawls may correspond to the pawls designated by 12 and 17 respectively in Fig. 1, or they may be different therefrom but rigidly connected with the corresponding pawls of said Fig. 1. These pawls 24, 25 are rigidly connected with arms 27 and 26 respectively, both sets being mounted upon pivots 30, 31. The rack bars 9, 13 are provided with pins 32, 33, so arranged that when the slide 8 is moved to zero which is effected by simply moving said slide 8 back and forth to its normal position, the arms 27 and 26 will be engaged thereby and in consequence thereof their respective pawls will be disengaged from the gear wheels 11, 16, which latter will then be freely movable to the zero position under the action of springs 34, 35 connected to the axes of said wheels. In place of springs hand operated means may of course, also be provided. By this means all three sets of indicating wheels 2, 3, 4 can be brought back to zero when the wheels 3, are zeroized by moving the respective handles 8 back and forth. No mechanism is required for zeroizing the indicating wheels 3, inasmuch as these are positively geared to the slides 8.

The operation of the device may be effected for instance in the following manner. A purchaser who has to pay $3 gives a $5 bill to the cashier who will then take hold of the handle 20 at the tooth 5 and moves it toward the left until it registers with the stop 22, said tooth and stop indicating a given operative position of the bar-sliding means. In the windows 5 and 6 the number 5 will then appear, while no registration at all is effected in the window 7 because the rack bar or segment 13 will yield as before described. Then the cashier takes hold of the handle or bar 21 at the tooth "3", and moves that bar in the opposite direction until it registers with the stop 23, the last mentioned tooth and stop indicating another operative position of the bar-sliding means. Now the rack bar or segment 9 will yield so that the registration and indication of the amount paid by the customer remains unchanged; but the rack bar or segment 13 is actuated and in the window 7 the sum to be paid, that is to say the number "3" will appear. At the same time however, the indicating roller or disk 3 is rotated back three points so that the window 6 will then show the change to be paid by the cashier that is to say the number "2."

All three registering and indicating devices may of course, be connected with adding and with printing or multiplying devices of any kind, not shown in the drawing. This may be effected by mounting an ordinary counting and number printing mechanism, by means of one way couplings for instance, not shown in the drawings, on the shafts of the three sets of indicating wheels 2, 3 and 4 and when arranged in this manner the invention may also be used as a book keeping machine or as a controlling device when the amounts are not paid in cash, but are merely written down and recorded.

What I claim as my invention is:—

1. Autographic accounting register, comprising in combination, a series of sliding toothed bars, indicating wheels engaged with said bars, two of said bars having teeth facing respectively in opposite directions, and being yieldingly engaged with their corresponding indicating wheels, means to lock said indicating wheels in position, the said series of bars including another unyielding sliding toothed bar continuously engaged with another of said indicating wheels, means for effecting the sliding movement of said bars, and means for indicating operative positions of said bar-sliding means.

2. Autographic accounting register, comprising in combination, a yielding rack bar having teeth facing toward the left, another yielding rack bar having teeth facing toward the right, indicating wheels engaging with said yielding rack bars, means for locking said indicating wheels in position, sliding means connected to said yielding rack bars, an unyielding rack bar having a series of gear teeth and connected to said sliding means, an indicating mechanism constantly engaging with the teeth of said unyielding bar, sliding means connected with said bars, and indicating means connected to said bar-sliding means.

3. Autographic accounting register, comprising in combination a slide, three series of rack teeth connected to said slide, two of said series of rack teeth being yieldingly connected to said slide, means to move said yielding rack teeth at an angle to the movement of said slide, counting mechanisms engaging with said yielding rack teeth, an unyielding series of teeth rigidly connected to said slide, a counting mechanism in engagement with said unyielding rack teeth, indicating means connected to said counting mechanisms, and indicating means connected to said slide.

4. Autographic accounting register, comprising in combination, a slide, two rack bars yieldingly connected to said slide, indicating wheels engaging with said rack bars, and each including a toothed wheel and an indicating roller or disk coaxial with the toothed wheel and rigidly connected thereto, locking means engaging with said toothed wheels and two projecting handles connected to said slide, and bearing indicating marks corresponding to the position of said counting wheels.

In testimony whereof I herewith affix my signature, in presence of two witnesses.

MAX KLACZKO.

Witnesses:
HENRY HASPER,
WOLDEMAR HAUPT.

Copies of this patent may be obtained for five cents each, by addressing the "Commissioner of Patents, Washington, D. C."